(12) United States Patent
Frick et al.

(10) Patent No.: US 6,505,516 B1
(45) Date of Patent: Jan. 14, 2003

(54) CAPACITIVE PRESSURE SENSING WITH MOVING DIELECTRIC

(75) Inventors: Roger L. Frick, Hackensack; Charles R. Willcox, Eden Prairie, both of MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 09/478,434

(22) Filed: Jan. 6, 2000

(51) Int. Cl.⁷ ................................................. G01L 9/12
(52) U.S. Cl. ....................................................... 73/718
(58) Field of Search ........................ 73/718, 724, 717, 73/716, 715, 720, 721, 727, 756; 361/283, 283.4

(56) References Cited

U.S. PATENT DOCUMENTS

| | | | |
|---|---|---|---|
| 3,079,576 A | 2/1963 | Kooiman | 338/4 |
| 3,147,085 A | 9/1964 | Gatti | 23/284 |
| 3,239,827 A | 3/1966 | Werner et al. | 340/236 |
| 3,356,963 A | 12/1967 | Buck | 331/65 |

(List continued on next page.)

FOREIGN PATENT DOCUMENTS

| | | |
|---|---|---|
| CH | 8272/79 | 9/1979 |
| CH | 632 891 G | 11/1982 |

(List continued on next page.)

OTHER PUBLICATIONS

"Why Nanoparticles are so Big" for *Chemical Engineering*, by Charlene Crabb et al., pp. 37–41, Apr. 1999.
U.S. patent application Ser. No. 09/477,689, Sittler, filed Jan. 6, 2000, pending.
U.S. patent application Ser. No. 09/478,383, Lutz et al., filed Jan. 6, 2000, pending.
U.S. patent application Ser. No. 09/603,640, Sittler et al., filed Jan. 6, 2000, pending.
U.S. patent application Ser. No. 09/755,346, Romo et al., filed Jan. 5, 2001, pending.
"Silicon–on–Sapphire Pressure Sensor", by C. Qinggui et al., *Transducers*, (1987), 4 pgs.
"Spectroscopic Study of the Surfaces of Glass Joined by Optical Contact", by V.M. Zolotarev et al., *Sov. J. Opt. Technol.*, (Jun. 1977), pp. 379–380.
"Effect of Scale and Time Factors on the Mechanical Strength of an Optical Contact", by S.S. Kachkin et al., *Sov. J. Opt. Technol.*, vol. 56, No. 2, (Feb. 1989), pp. 110–112.
"High Pressure Sensors", *Instrument Engineers Handbook vol. 1, Process Measurement*, B. Liptak, Editor, pp. 244–245.
"Silicon on Sapphire: The Key Technology for High–Temperature Piezoresistive Pressure Transducers", by H.W. Keller et al., *Transducers*, (1987), 4 pgs.
"Optical–Contact Bonding Strength of Glass Components", by S.S. Kachkin et al., *Sov. J. Opt. Technol.*, vol. 47, No. 3, (Mar. 1980), pp. 159–161.
"A Cold High–Vacuum Seal Without Gaskets", by L. Macebo, *University of California Lawrence Radiation Laboratory*, (Sep. 1, 1962), pp. 1–11.

(List continued on next page.)

Primary Examiner—William Oen
(74) Attorney, Agent, or Firm—Wetman, Champlin & Kelly, P.A.

(57) ABSTRACT

A pressure sensor with a diaphragm that has a dielectric portion that moves in a cavity near capacitor plates that are fixed relative to a mounting frame. The diaphragm is supported on the frame and the frame surrounds the cavity. The diaphragm has an outer surface that receives pressure and has an inner surface facing the cavity. The capacitor plates, which are fixed, sense movement of the nearby dielectric portion and generate an electrical output representative of pressure. Creep of metallizations on a flexible diaphragm are avoided. Manufacture is simplified because metallization of the diaphragm is avoided.

22 Claims, 12 Drawing Sheets

U.S. PATENT DOCUMENTS

| | | | |
|---|---|---|---|
| 3,387,226 A | 6/1968 | Haisma et al. | 331/94.5 |
| 3,405,559 A | 10/1968 | Moffatt | 73/398 |
| 3,477,036 A | 11/1969 | Haisma | 331/94.5 |
| 3,589,965 A | 6/1971 | Wallis et al. | 156/272 |
| 3,645,137 A | 2/1972 | Hazen | 73/398 |
| 3,696,985 A | 10/1972 | Herring et al. | 228/4.29 |
| 3,743,552 A | 7/1973 | Fa | 148/175 |
| 3,744,120 A | 7/1973 | Burgess et al. | 29/494 |
| 3,750,476 A | 8/1973 | Brown | 73/398 |
| 3,766,634 A | 10/1973 | Babcock et al. | 29/471.9 |
| 3,834,604 A | 9/1974 | Fendley et al. | 228/5 |
| 3,854,892 A | 12/1974 | Burgess et al. | 29/196.1 |
| 3,858,097 A | 12/1974 | Polye | 317/248 |
| 3,899,878 A | 8/1975 | Compton et al. | 60/39.28 T |
| 3,939,559 A | 2/1976 | Fendley et al. | 29/628 |
| RE28,798 E | 5/1976 | Herring et al. | 228/5.5 |
| 3,962,921 A | 6/1976 | Lips | 73/398 |
| 3,994,430 A | 11/1976 | Cusano et al. | 228/122 |
| 4,018,374 A | 4/1977 | Lee et al. | 228/121 |
| 4,064,549 A | 12/1977 | Cretzler | 361/283 |
| 4,078,711 A | 3/1978 | Bell et al. | 228/123 |
| 4,084,438 A | 4/1978 | Lee et al. | 73/706 |
| 4,088,799 A | 5/1978 | Kurtin | 427/38 |
| 4,127,840 A | 11/1978 | House | 338/4 |
| 4,128,006 A | 12/1978 | Grabow | 73/724 |
| 4,158,217 A | 6/1979 | Bell | 361/283 |
| 4,177,496 A | 12/1979 | Bell et al. | 361/283 |
| 4,196,632 A | 4/1980 | Sikorra | 73/718 |
| 4,202,217 A | 5/1980 | Kurtz et al. | 73/727 |
| 4,208,782 A | 6/1980 | Kurtz et al. | 29/580 |
| 4,216,404 A | 8/1980 | Kurtz et al. | 310/338 |
| 4,222,277 A | 9/1980 | Kurtz et al. | 73/721 |
| 4,236,137 A | 11/1980 | Kurtz et al. | 338/4 |
| 4,257,274 A | 3/1981 | Shimada et al. | 73/718 |
| 4,274,125 A | 6/1981 | Vogel | 361/283 |
| 4,276,533 A | 6/1981 | Tominaga et al. | 338/4 |
| 4,278,195 A | 7/1981 | Singh | 228/123 |
| 4,287,501 A | 9/1981 | Tominaga et al. | 338/42 |
| 4,301,492 A | 11/1981 | Paquin et al. | 361/283 |
| 4,359,498 A | 11/1982 | Mallon et al. | 428/156 |
| 4,366,716 A | 1/1983 | Yoshida | 73/718 |
| 4,389,895 A | 6/1983 | Rud, Jr. | 73/724 |
| 4,410,872 A | 10/1983 | Stecher et al. | 338/114 |
| 4,412,203 A | 10/1983 | Kurtz et al. | 338/4 |
| 4,416,156 A | 11/1983 | Demark et al. | 73/727 |
| 4,419,142 A | 12/1983 | Matsukawa | 148/1.5 |
| 4,422,125 A | 12/1983 | Antonazzi et al. | 361/283 |
| 4,422,335 A | 12/1983 | Ohnesorge et al. | 73/724 |
| 4,424,713 A | 1/1984 | Kroninger, Jr. et al. | 73/718 |
| 4,426,673 A | 1/1984 | Bell et al. | 361/283 |
| 4,434,665 A | 3/1984 | Adolfsson et al. | 73/724 |
| 4,443,293 A | 4/1984 | Mallon et al. | 156/647 |
| 4,454,765 A | 6/1984 | Lodge | 73/724 |
| 4,456,901 A | 6/1984 | Kurtz et al. | 338/4 |
| 4,479,070 A | 10/1984 | Frische et al. | 310/338 |
| 4,495,820 A | 1/1985 | Shimada et al. | 73/724 |
| 4,497,473 A | 2/1985 | Robyn et al. | 266/44 |
| 4,507,973 A | 4/1985 | Barr et al. | 73/724 |
| 4,517,622 A | 5/1985 | Male | 361/283 |
| 4,525,766 A | 6/1985 | Petersen | 361/283 |
| 4,535,219 A | 8/1985 | Sliwa, Jr. | 219/121 |
| 4,539,061 A | 9/1985 | Sagiv | 156/278 |
| 4,542,436 A | 9/1985 | Carusillo | 361/283 |
| 4,547,801 A | 10/1985 | Haisma et al. | 358/111 |
| 4,558,817 A | 12/1985 | Kiendl | 236/12.12 |
| 4,572,000 A | 2/1986 | Kooiman | 73/718 |
| 4,586,109 A | 4/1986 | Peters et al. | 261/283 |
| 4,591,401 A | 5/1986 | Neidig et al. | 156/89 |
| 4,598,996 A | 7/1986 | Taniuchi | 356/43 |
| 4,609,966 A | 9/1986 | Kuisma | 361/283 |
| 4,625,559 A | 12/1986 | Carter et al. | 73/706 |
| 4,628,403 A | 12/1986 | Kuisma | 361/283 |
| 4,649,070 A | 3/1987 | Kondo et al. | 428/209 |
| 4,689,999 A | 9/1987 | Shkedi | 73/708 |
| 4,703,658 A | 11/1987 | Mrozack, Jr. et al. | 73/724 |
| 4,716,492 A | 12/1987 | Charboneau et al. | 361/283 |
| 4,753,109 A | 6/1988 | Zabler | 73/115 |
| 4,754,365 A | 6/1988 | Kazahaya | 361/283 |
| 4,764,747 A | 8/1988 | Kurtz et al. | 338/2 |
| 4,769,882 A | 9/1988 | Rosen et al. | 29/25.35 |
| 4,773,972 A | 9/1988 | Mikkor | 204/16 |
| 4,774,196 A | 9/1988 | Blanchard | 437/24 |
| 4,780,572 A | 10/1988 | Kondo et al. | 174/52 |
| 4,800,758 A | 1/1989 | Knecht et al. | 73/727 |
| 4,806,783 A | 2/1989 | Anderson | 307/118 |
| 4,810,318 A | 3/1989 | Haisma et al. | 156/153 |
| 4,849,374 A | 7/1989 | Chen et al. | 437/209 |
| 4,852,408 A | 8/1989 | Sanders | 73/718 |
| 4,857,130 A | 8/1989 | Curtis | 156/292 |
| 4,875,368 A | 10/1989 | Delatorre | 73/151 |
| 4,879,903 A | 11/1989 | Ramsey et al. | 73/431 |
| 4,883,215 A | 11/1989 | Goesele et al. | 228/116 |
| 4,901,197 A | 2/1990 | Albarda et al. | 361/283 |
| 4,908,921 A | 3/1990 | Chen et al. | 29/25.41 |
| 4,929,893 A | 5/1990 | Sato et al. | 324/158 |
| 4,954,925 A | 9/1990 | Bullis et al. | 361/283 |
| 4,971,925 A | 11/1990 | Alexander et al. | 437/62 |
| 4,972,717 A | 11/1990 | Southworth et al. | 73/724 |
| 4,980,243 A | 12/1990 | Malikowski et al. | 428/621 |
| 4,983,251 A | 1/1991 | Haisma et al. | 156/630 |
| 4,994,781 A | 2/1991 | Sahagen | 338/47 |
| 5,001,934 A | 3/1991 | Tuckey | 73/721 |
| 5,005,421 A | 4/1991 | Hegner et al. | 73/72 |
| 5,009,689 A | 4/1991 | Haisma et al. | 65/33 |
| 5,013,380 A | 5/1991 | Aoshima | 156/250 |
| 5,024,098 A | 6/1991 | Petitjean et al. | 73/729 |
| 5,028,558 A | 7/1991 | Haisma et al. | 437/62 |
| 5,044,202 A | 9/1991 | Southworth et al. | 73/724 |
| 5,050,034 A | 9/1991 | Hegner et al. | 361/283 |
| 5,050,035 A | 9/1991 | Hegner et al. | 361/283 |
| 5,068,712 A | 11/1991 | Murakami et al. | 357/72 |
| 5,084,123 A | 1/1992 | Curtis | 156/292 |
| 5,087,124 A | 2/1992 | Smith et al. | 356/358 |
| 5,094,109 A | 3/1992 | Dean et al. | 73/718 |
| 5,095,741 A | 3/1992 | Bartig et al. | 73/115 |
| 5,113,868 A | 5/1992 | Wise et al. | 128/675 |
| 5,123,849 A | 6/1992 | Deak et al. | 439/66 |
| 5,133,215 A | 7/1992 | Lane, III et al. | 73/756 |
| 5,155,061 A | 10/1992 | O'Connor et al. | 437/86 |
| 5,174,926 A | 12/1992 | Sahagen | 252/521 |
| 5,178,015 A | 1/1993 | Loeppert et al. | 73/718 |
| 5,189,591 A | 2/1993 | Bernot | 361/283 |
| 5,189,916 A | 3/1993 | Mizumoto et al. | 73/724 |
| 5,197,892 A | 3/1993 | Yoshizawa et al. | 439/91 |
| 5,201,228 A | 4/1993 | Kojima et al. | 73/724 |
| 5,201,977 A | 4/1993 | Aoshima | 156/153 |
| 5,214,563 A | 5/1993 | Estes | 361/386 |
| 5,214,961 A | 6/1993 | Kojima et al. | 73/715 |
| 5,227,068 A | 7/1993 | Runyon | 210/610 |
| 5,228,862 A | 7/1993 | Baumberger et al. | 439/66 |
| 5,231,301 A | 7/1993 | Peterson et al. | 257/419 |
| 5,236,118 A | 8/1993 | Bower et al. | 228/193 |
| 5,242,863 A | 9/1993 | Xiang-Zheng et al. | 437/228 |
| 5,242,864 A | 9/1993 | Fassberg et al. | 437/228 |
| 5,257,542 A | 11/1993 | Voss | 73/724 |
| 5,261,999 A | 11/1993 | Pinker et al. | 156/630 |
| 5,271,277 A | 12/1993 | Pandorf | 73/724 |
| 5,287,746 A | 2/1994 | Broden | 73/706 |
| 5,294,760 A | 3/1994 | Bower et al. | 200/83 |
| 5,314,107 A | 5/1994 | d'Aragona et al. | 228/116 |
| 5,315,481 A | 5/1994 | Smolley | 361/707 |
| 5,319,324 A | 6/1994 | Satoh et al. | 331/158 |
| 5,326,726 A | 7/1994 | Tsang et al. | 437/228 |
| 5,332,469 A | 7/1994 | Mastrangelo | 156/643 |
| 5,349,492 A | 9/1994 | Kimura et al. | 361/283.4 |
| 5,381,300 A | 1/1995 | Thomas et al. | 361/280 |
| 5,424,650 A | 6/1995 | Frick | 324/688 |
| 5,437,189 A | 8/1995 | Brown et al. | 73/721 |
| 5,440,075 A | 8/1995 | Kawakita et al. | 174/265 |
| 5,466,630 A | 11/1995 | Lur | 437/62 |

| | | | | | |
|---|---|---|---|---|---|
| 5,470,797 A | 11/1995 | Mastrangelo ............... 437/225 | JP | 2-148768 | 6/1990 |
| 5,471,884 A | 12/1995 | Czarnocki et al. ............ 73/720 | JP | 2-249936 | 10/1990 |
| 5,478,972 A | 12/1995 | Mizutani et al. ............ 174/250 | JP | 3-239940 | 10/1991 |
| 5,479,827 A * | 1/1996 | Kimura et al. ............... 73/718 | JP | 2852593 | 3/1993 |
| 5,481,795 A | 1/1996 | Hatakeyama et al. ......... 29/852 | JP | 5-213975 | 9/1993 |
| 5,483,834 A | 1/1996 | Frick ........................... 73/724 | JP | 5-107254 | 12/1993 |
| 5,528,452 A | 6/1996 | Ko .......................... 361/283.4 | JP | 6-21741 | 1/1994 |
| 5,532,187 A | 7/1996 | Schreiber-Prillwitz et al. ............ 437/182 | JP | 6-265428 | 9/1994 |
| 5,554,809 A | 9/1996 | Tobita et al. ................. 73/700 | JP | 6-300650 | 10/1994 |
| 5,612,497 A * | 3/1997 | Walter et al. ................. 73/756 | JP | 2000111434 | 10/1998 |
| 5,637,802 A * | 6/1997 | Frick et al. ................... 73/724 | JP | 11006780 | 12/1999 |
| 5,731,522 A | 3/1998 | Sittler ......................... 73/708 | SU | 463643 | 10/1975 |
| 6,106,476 A | 8/2000 | Corl et al. ................... 600/486 | SU | 736216 | 5/1980 |
| 6,126,889 A | 10/2000 | Scott et al. ................. 264/632 | SU | 1398825 A1 | 5/1988 |
| 6,131,462 A | 10/2000 | EerNisse et al. .............. 73/702 | SU | 1597627 A1 | 10/1990 |
| | | | SU | 1629763 A1 | 2/1991 |
| | | | WO | WO 83/00385 | 2/1983 |

FOREIGN PATENT DOCUMENTS

| | | |
|---|---|---|
| CS | 153132 | 5/1974 |
| DE | 1 648 764 | 6/1971 |
| DE | 2 021 479 | 11/1971 |
| DE | 2 221 062 | 11/1972 |
| DE | 24 59 612 | 7/1975 |
| DE | 34 04 262 A1 | 9/1984 |
| DE | 40 11 901 A1 | 10/1991 |
| DE | 42 44 450 A1 | 12/1992 |
| EP | 0 024 945 A2 | 9/1980 |
| EP | 0 136 050 A1 | 8/1984 |
| EP | 0 161 740 A2 | 2/1985 |
| EP | 0 166 218 A2 | 5/1985 |
| EP | 0 182 032 A2 | 9/1985 |
| EP | 0 190 508 A2 | 12/1985 |
| EP | 0 207 272 A2 | 5/1986 |
| EP | 0 213 299 A2 | 6/1986 |
| EP | 0 210 843 A2 | 7/1986 |
| EP | 0 256 150 A1 | 8/1986 |
| EP | 0 351 701 B1 | 7/1989 |
| EP | 0 355 340 A1 | 2/1990 |
| EP | 0 383 391 A1 | 8/1990 |
| EP | 0 430 676 A2 | 11/1990 |
| EP | 0 410 679 A1 | 1/1991 |
| EP | 0 413 547 A2 | 2/1991 |
| EP | 0 444 942 A1 | 9/1991 |
| EP | 0 444 943 A | 9/1991 |
| EP | 0 451 993 A2 | 10/1991 |
| EP | 0 456 060 A1 | 11/1991 |
| EP | 0 460 763 A2 | 11/1991 |
| EP | 0 473 109 A2 | 3/1992 |
| EP | 0 476 897 A2 | 3/1992 |
| EP | 0 526 290 A1 | 2/1993 |
| EP | 0 547 684 A2 | 6/1993 |
| EP | 0 556 009 A2 | 8/1993 |
| EP | 0 579 298 A1 | 1/1994 |
| EP | 0 928 959 A2 | 7/1999 |
| FR | 1 568 487 | 5/1969 |
| FR | 2 246 506 | 2/1975 |
| FR | 2 455 733 | 11/1980 |
| GB | 1 069 435 | 11/1963 |
| GB | 1 305 885 | 4/1971 |
| GB | 2034478 | 6/1980 |
| GB | 2 071 853 A | 3/1981 |
| GB | 2 168 160 A | 11/1985 |
| JP | 49-38911 | 4/1974 |
| JP | 60-97676 | 5/1985 |
| JP | 62-70271 | 3/1987 |
| JP | 60-195546 | 7/1987 |
| JP | 62-104131 | 7/1987 |
| JP | 62-167426 | 7/1987 |
| JP | 62-259475 | 11/1987 |
| JP | 63-285195 | 11/1988 |
| JP | 63-292032 | 11/1988 |
| JP | 91-311556 | 4/1990 |

| | | |
|---|---|---|
| WO | WO 85/02677 | 6/1985 |
| WO | WO 87/07947 | 12/1987 |
| WO | WO 87/07948 | 12/1987 |
| WO | WO 93/22644 | 11/1993 |
| WO | WO 96/16418 | 5/1996 |

OTHER PUBLICATIONS

"Diffusionsschweissen Optischer Bauelemente Aus Quarzglas", by K. Veb et al., *Schweisstechnik, Berlin*, (1983), pp. 262–264.

"Pressure and Temperature Measurements with Saw Sensors", by D. Hauden et al., *36th Annual Frequency Control Symposium*, (1982), pp. 284–289.

"Transient Response of Capacitive Pressure Sensors", by P. Pons et al., *Sensors and Actuators,* (1992) pp. 616–621.

"Analysis and Design of a Four–Terminal Silicon Pressure Sensor at the Centre of a Diaphragm", by M. Bao et al, *Sensors and Actuators,* (1987), pp. 49–56.

"A Stress and Temperature Compensated Orientation and Propagation Direction for Surface Acoustic Wave Devices", by B. Sinha, *IEEE Transactions on Ultrasonics, Ferroelectrics, and Frequency Control*, vol. UFFC–34, No. 1, (Jan. 1987), pp. 64–74.

"Nonlinear Analyses on CMOS Integrated Silicon Pressure Sensors", by K. Suzuki et al., *IEEE,* (1985), pp. 137–140.

"New Techniques for Fusion Bonding and Replication for Large Glass Reflectors", by J.R. Angel, *Steward Observatory, University of Arizona*, pp. 52–56.

"Pressure Sensitivity in Anisotropically Etched Thin–Diaphragm Pressure Sensors", by S. Clark et al., *IEEE Transactions on Electron Devices*, vol. Ed–26, No. 12, (Dec. 1979), pp. 1887–1896.

"A Model for the Silicon Wafer Bonding Process", by R. Stengl et al., *Japanese Journal on Applied Physics,* (Oct. 1989), pp. 1735–1741.

"Study of the Stressed State of a Sintered Quartz Monoblock", by Y. Lisitsyn et al., *Plenum Publishing Corporation,* (1986), pp. 643–645.

"Direct Bonding in Patent Literature", by J. Haisma, *Philips J. Res.,* (1995), pp. 165–170.

"Special Issue on Direct Bonding", by J. Haisma et al., *Philips Journal of Research*, vol. 49, No. 1/2, (1995), pp. 1–182.

"Diversity and Feasibility of Direct Bonding: A Survey of a Dedicated Optical Technology", by J. Haisma et al., *Applied Optics,* vol. 33, No. 7, (Mar. 1994), pp. 1154–1169.

"Structure and Morphology of the Reaction Fronts During the Formation of $MgAl_2O_4$ Thin Films by Solid State Reaction Between R–cut Sapphire Substrates and MgO Films", by D. Hesse et al., *Interface Science,* (1994) pp. 221–237.

"Development of a High Temperature Capacitive Pressure Transducer", by R.L. Egger, *NASA CR–135282* (Oct. 1977)., pp. 1–114.

"High Temperature Pressure Transducer", *Techlink Industry*, Techlink No. 2359, (1978), 2 pgs.

"Quartz Capsule Pressure Transducer for the Automotive Industry", by D.Y. Lee et al., *SAE Technical Paper Series Society of Automotive Engineers, Inc.*, (Feb. 1981), 6 pgs.

"Low–Cost High–Sensitivity Integrated Pressure and Temperature Sensor", by P. Pons et al., *Sensors and Actuators*, (1994), pp. 398–401.

"A New Type of High Performance Device for VLSI Digital System", by X. Xiao–Li et al., *Solid State Devices*, (1988), pp. 579–582.

"Wafer Bonding For SOI", by W.P. Maszara et al., *Mat. Res. Soc. Symp. Proc.*. vol. 107, (1988), 2 pgs.

"Silicon Fusion Bonding For Pressure Sensors", by K. Petersen et al., *IEEE*, (1988), pp. 146–147.

"Silicon–To–Silicon Direct Bonding Method", by M. Shimbo et al., *Journal of Applied Physics*, vol. 60, No. 8, (Oct. 1986), pp. 2987–2989.

"A Model for the Silicon Wafer Bonding Process", by R. Stengl et al., *Japanese Journal of Applied Physics*, vol. 28, No. 10, (Oct. 1989), pp. 1735 & 1741.

"A Small and Stable Continuous Gas Laser", by H. G. Van Bueren et al., *Physics Letters* vol. 2, No. 7, (Nov. 1962), 2 pgs.

"Direct Bonding of Ceramics and Metals by Means of a Surface Activation Method in Ultrahigh Vacumm", by T. Suga et al., *Proceedings of the MRS International Meeting on Advanced Materials*, vol. 8, (Jun. 1988), pp. 257–263.

"Silicon–On–Insulator Wafer Bonding–Wafer Thinning Technological Evaluations", by J. Haisma et al., *Japanese Journal of Applied Physics*, vol. 28, No. 8, (Aug. 1989), 4 pgs.

"Closure and Repropogation of Healed Cracks in Silicate Glass", by T. Michalske et al., *Journal of the American Ceramic Society*, vol., 68, No. 11, (Nov. 1985), 3 pgs.

"Use of Strain Gauges with a Silicon–On–Sapphire Structure for Thermophysical Experiments", by V.F. Kukarin et al., *Plenum Publishing Corporation*, (1986) pp. 1085–1087.

"Metrological Characteristics for Sapfir–22D Pressure Sensors", by A.M. Evtyushenkov et al., *Plenum Publishing Corporation*, (1989), pp. 147–150.

"Low–Temperature Characteristics of the Transducer", *Rev. Sci. Instrum.*, vol. 56, No. 6, (Jun. 1985), pp. 1237–1238.

"The Joining of Ceramics", by A.S. Bahrani, *Int. J. for the Joining of Materials*, vol. 4, No. 1 (1992), pp. 13–19.

"Chemical Free Room Temperature Wafer to Wafer Direct Bonding", by S. Farrens et al.., *J. Electrochem. Soc.*, vol. 142, No. 11, (Nov. 1985), pp. 3949–3955.

"Morphological Evolution of Pore Channels in Alumina", by J. Rodel et al., *Ceramic Transactions—Sintering of Advanced Ceramics*, vol. 7, (May 1988), pp. 243–257.

"Le Poli Optique, Element De La Construction Des Tubes A Vide (')", by P. Danzin et al., *Annales De Radioelectricite*, (Jan. 1948), pp. 281–289.

"Strength of Glass Ceramic S0115M and its Joints Based on Optical Contact", by A.I. Busel et al, *Plenum Publishing Corporation*, (1983), p. 378.

"Bubble–Free Silicon Wafer Bonding in a Non–Cleanroom Environment", by R. Stengl et al., *Department of Mechanical Engineering and Materials Science, Duke University*, (1988) p. L2364.

"Boundary Migration of Single Crystal in Polycrystalline Alumina", by M. Kinoshita, *Journal of the Ceramic Society of Japan*, vol. 82, No. 945, (1974), pp. 295–296.

"Diffusion Bonding of Ceramics", by C. Scott et al., *American Ceramic Society Bulletin*, (Aug. 1985) pp. 1129–1131.

"Creep of Sensor's Elastic Elements: Metals versus Non–metals", K. Bethe, D. Baumgarten and J. Frank, *NOVA Sensor—Silicon Sensors and Microstructure*, 1990, pp. 844–849.

"High–Temperature Healing of Lithographically Introduced Cracks in Sapphire", J. Rödel and A.M. Glaseser, *J. Am. Ceram. Socl.*, vol. 73, No. 3, Mar. 1990, pp. 592–601.

"Fabrication of an Implantable Capacitive Type Pressure Sensor", S. Shoji, T. Nisase, M. Esashi and T. Matsuo, *Transducers '87*, 1987.

"Small sensitive pressure transducer for use at low temperatures", W. Griffioen and G. Frossati, *Rev. Sci. Instrum.*, vol. 56, No. 6, Jun. 1985, pp. 1236–1238.

"Interface charge control of directly bonded silicon structures", S. Bengtsson and O. Engström, *J. Appl. Phys.*, vol. 66, No. 3, Aug. 1, 1989, pp. 1231–1239.

"Wafer bonding for silicon–on–insulator technologies", J.B. Lasky, *Appl. Phys Lett.*, vol. 48, No. 1, Jan. 1, 1986, pp. 78–80.

"Production of Controlled–Morphology Pore Arrays: Implications and Opportunities", J. Rödel and A.M. Glaeser, *J. Am. Ceram. Soc.*, vol. 70, No. 8, Aug. 1987, pp. C–172—C–175.

"Low–Temperature Preparation of Silicon/Silicon Interface by the Silicon–to–Silicon Direct Bonding Method", by S. Bengtsson et al., *J. Electrochem. Soc.*, vol. 137, No. 7, (Jul. 1990), pp. 2297–2303.

"Phase Formation Study in $\alpha$–$Al_2O_3$ Implanted With Niobium Ions", by L. Romana, P. Thevenard, B. Canut, G. Massouras and R. Brenier, *Nuclear Instruments and Methods in Physics Research B46*, published by Elsevier Science Publishers B.V. (North–Holland), pp. 94–97 (1990).

"Surface electrical properties of Ni–implanted sapphire", by L. Shipu, F. Donghui, X. Ning, S. Zhenya and C. Xiaoming, *Processing of Advanced Materials*, published by Chapman & Hall, pp. 77–80 (1991).

"Silicon Microcavities Fabricated with a New Technique", L. Tenerz and B. Hök, *Electronics Letters*, vol. 22, No. 11, May 22, 1986, pp. 615–616.

"A Balanced Resonant Pressure Sensor", E. Stemme and G. Stemme, *Sensors and Actuators*, A21–A23, 1990, pp. 336–341.

"Silicon Sensors and Microstructure", J. Brysek, K. Petersen, J. Mallon, Jr., L. Christel, F. Pourahmadi, *NOVA Sensor*, Jun. 1990, pp. 5.4–5.8, 8.21–8.23, 9.9–9.10, 9.13–9.15.

U.S. patent application Ser. No. 09/477,689, Sittler, filed Jan. 1, 2000.

U.S. patent application Ser. No. 09/478,383, Lutz et al., filed Jan. 1, 2000.

U.S. patent application Ser. No. 09/603,640, Sittler et al., filed Jan. 6, 2000.

U.S. patent application Ser. No. 09/755,346, Romo et al., filed Jan. 5, 2001.

\* cited by examiner

CAPACITIVE PRESSURE SENSING WITH MOVING DIELECTRIC

CROSS REFERENCE TO CO-PENDING APPLICATIONS

This application is related to co-pending application Ser. No. 09/478,383 filed Jan. 6, 2000 entitled METHOD AND APPARATUS FOR A DIRECT BONDED ISOLATED PRESSURE SENSOR, and co-pending application Ser. No. 09/477,689 filed Jan. 6, 2000 entitled PRESSURE SENSOR CAPSULE WITH IMPROVED ISOLATION.

BACKGROUND OF THE INVENTION

Capacitive pressure sensors are used in demanding applications such as industrial transmitters and aerospace probes. Sensor bodies are formed from stacked layers of low hysteresis dielectric material such as sapphire, silicon or ceramic. At least one layer in the stack includes a thinned diaphragm region that is deflected by the pressure. A metal capacitor plate is deposited on the diaphragm region and an opposite support plate to form a capacitor. The metal capacitor plate on the diaphragm can cause problems because the metal creeps when the diaphragm deflects, leading to hysteresis errors in the measured pressure Deposition of the capacitor plate on the diaphragm and a lead to the capacitor plate are manufacturing processes that can be costly to implement and control in mass production.

The problem with hysteresis errors due to the presence of metal on the deflecting low hysteresis diaphragm material becomes increasingly important as other sources of pressure sensor error are corrected through use of improved diaphragm materials, improved bonding such as direct bonding and improved stress isolation in mounting sensors and electrical leads. A technology is needed that avoids the problems with depositing metal on diaphragms and the creep or hysteresis in metals on deflecting diaphragms in pressure sensors in demanding applications.

SUMMARY OF THE INVENTION

A pressure sensor includes a diaphragm that has a dielectric portion that moves in a cavity near capacitor plates that are fixed relative to a mounting frame.

The diaphragm is supported on the frame and the frame surrounds the cavity. The diaphragm has an outer surface that receives pressure and has an inner surface facing the cavity. The inner surface carries a dielectric portion that is movable relative to the frame by the pressure.

The capacitor plates are not on the deflecting diaphragm, but are both fixed. The capacitor plates sense movement of the nearby dielectric portion of the deflecting diaphragm and generate an electrical output representative of pressure.

DETAILED DESCRIPTION OF THE PREFERRED EMBODIMENTS

Figure 1:
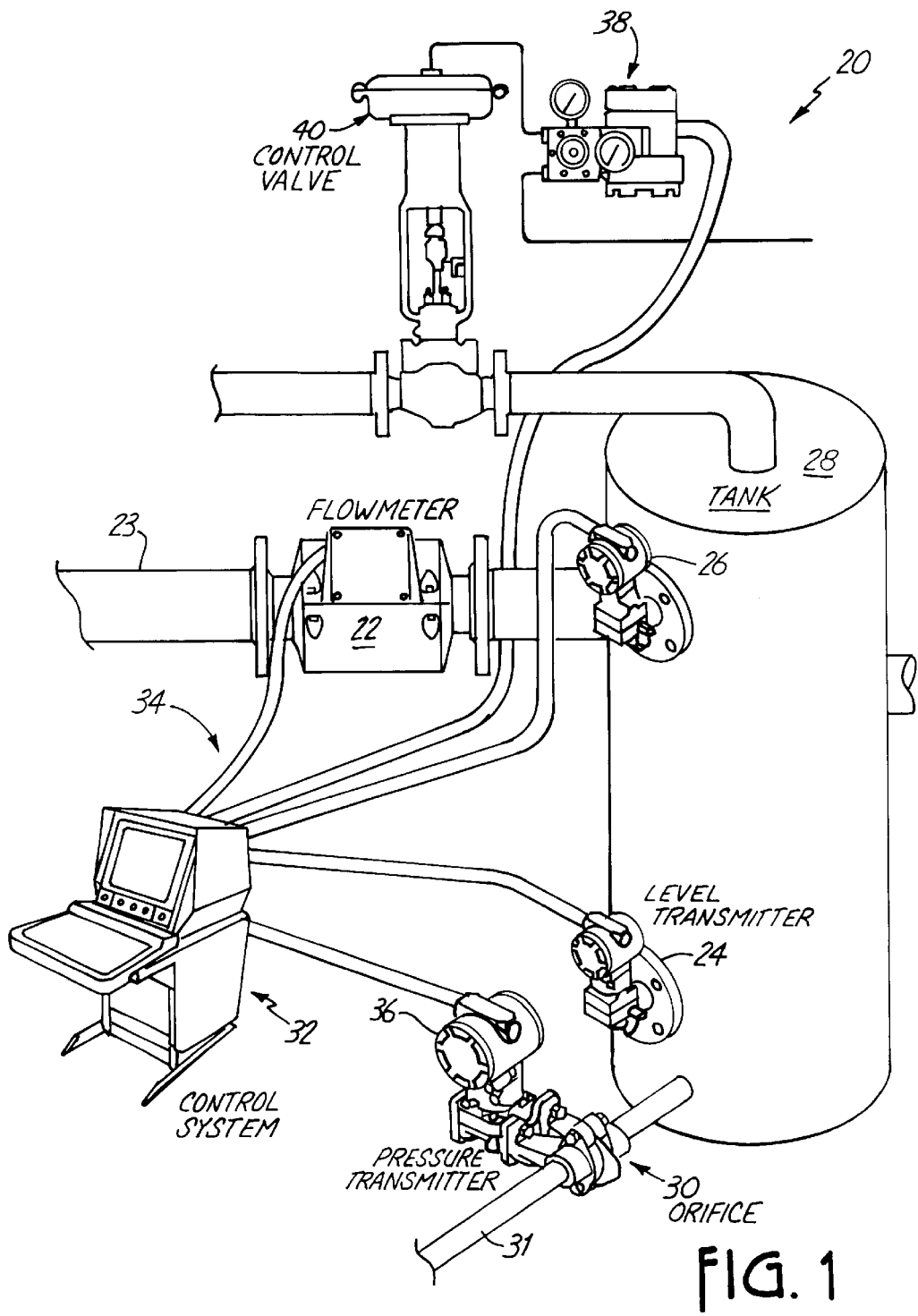
FIG. 1 shows an environment for a pressure transmitter.

In FIG. 1, a typical environment for an industrial pressure sensor is illustrated at 20. Process variable transmitters such as flow meter 22 in process fluid line 23, pressure transmitters 24, 26, 36 near tank 28 and integral orifice flow meter 30 in process line 31 are shown electrically connected to control system 32. Control system 32 controls current to pressure transducer 38 which controls control valve 40.

Process variable transmitters can be configured to monitor one or more process variables associated with process plant fluids such as slurries, liquids, vapors and gasses in chemical, pulp, petroleum, gas, pharmaceutical, food and other fluid processing plants. The monitored process variables can be pressure, temperature, flow, level, pH, conductivity, turbidity, density, concentration, chemical composition or other properties of fluids. A process variable transmitter includes one or more sensors that can be either internal to the transmitter or external to the transmitter, depending on the installation needs of the process plant.

Process variable transmitters generate one or more transmitter outputs that represent the sensed process variable. Transmitter outputs are configured for transmission over long distances to a controller 32 or indicator via communication busses 34. In typical fluid processing plants, a communication buss 34 can be a 4–20 mA current loop that powers the transmitter, or a fieldbus connection, a HART protocol communication or a fiber optic connection to a controller, a control system or a readout. In transmitters powered by a 2 wire loop, power is kept. low to provide intrinsic safety in explosive atmospheres.

Figure 2:
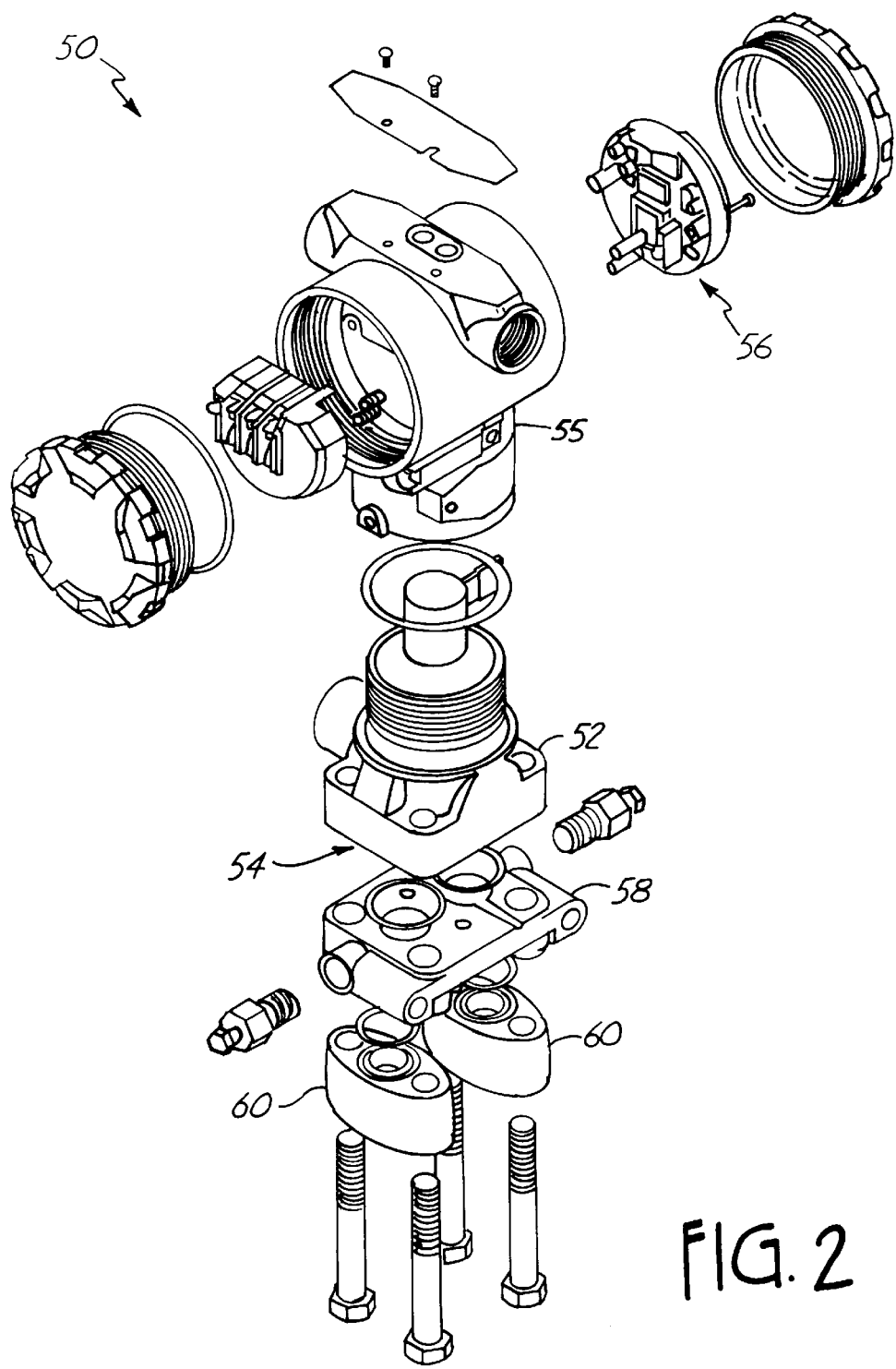
FIG. 2 shows an embodiment of a pressure transmitter.

FIG. 2 shows an exploded view of an example of a pressure transmitter 50. Transmitter 50 includes a flange 52 for receiving a differential pressure and a sensor module 54 that has two absolute pressure. sensors (not shown). The sensor module 54 couples to a housing 55 having electronic transmitter circuits 56. Transmitter 50 is bolted to flange adapter 58. Flange adapter 58 connects to impulse pipes connected to flange adapter unions 60 or other connection hardware. Each absolute pressure sensor in sensor module 54 can includes a moving dielectric portion as explained below.

Figure 3:
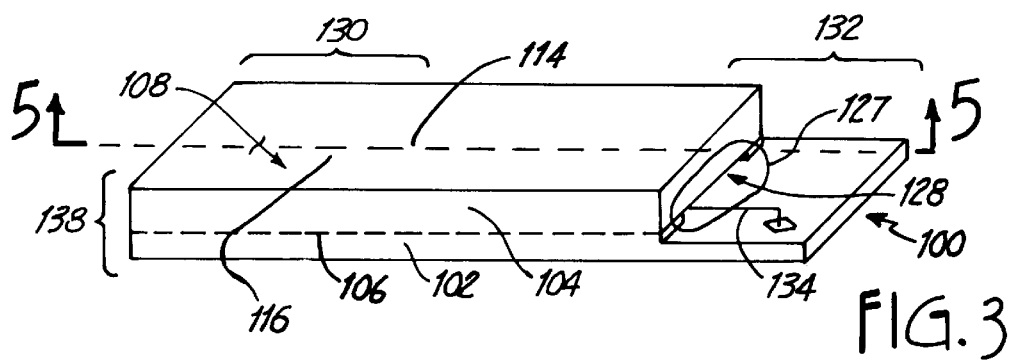
FIGS. 3–7 shows various views of an embodiment of a capacitive pressure sensor with a moving dielectric.
Figure 4:
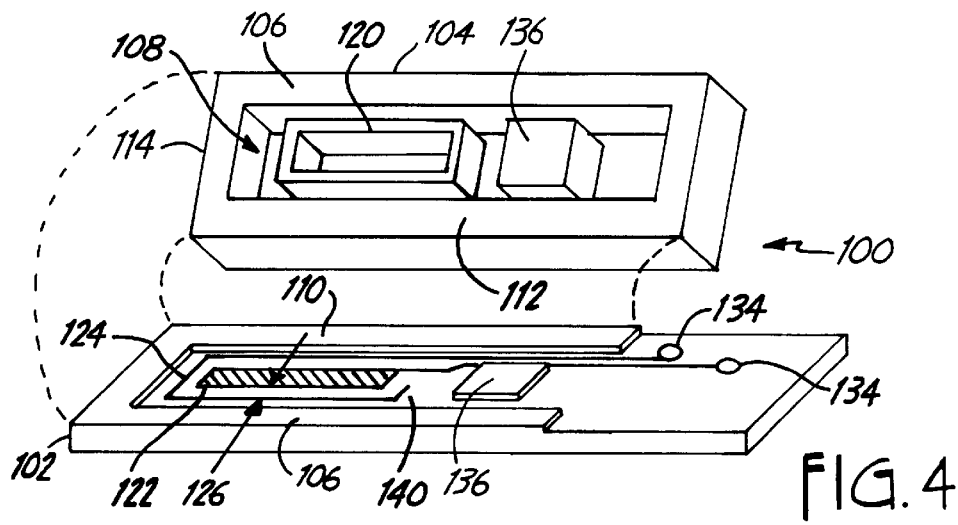
Figure 5:
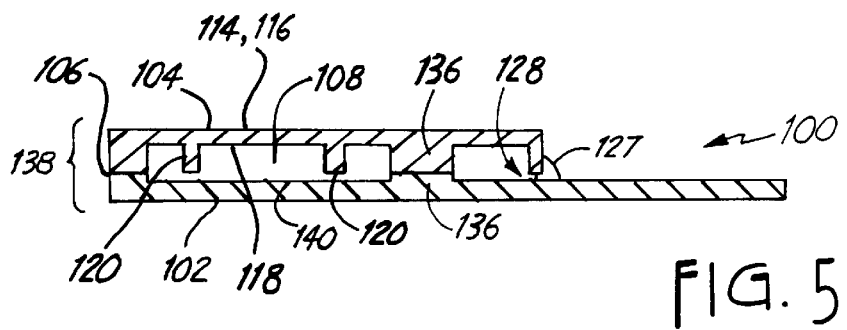

In FIGS. 3, 4 and 5, a perspective view, an exploded view and a cross sectional view of a pressure sensor 100 are shown. Pressure sensor 100 has a body made of two layers 102, 104 of material with low mechanical hysteresis. Layers 102, 104 are preferably sapphire, however, silicon, ceramic or glass can also be used for less demanding applications. Layer 102 is bonded to layer 104 at an outer rim or frame 106 that surrounds a cavity 108. The frame 106 includes a first frame portion 110 on layer 102 and a second frame portion 112 on layer 104. Alternatively, frame 106 can be formed on only one of the layers, or the sensor 100 can be made of three layers, with the middle layer providing the frame.

Layer 104 includes a thinned region or diaphragm 114 that is supported around its peripheral edge on the frame 106. Diaphragm 114 has an outer surface 116 receiving pressure and has an inner surface 118 facing the cavity 108.

A dielectric portion 120 is carried on the inner surface 118. The dielectric portion 120 moves with the diaphragm 114 relative to the frame 106 when the pressure deflects the diaphragm 114.

Capacitor plates 122, 124 are fixed relative to the frame 106 on a surface of layer 104 in the cavity 108 near the movable dielectric portion 120. The capacitor plates 122, 124 sense movement of the nearby dielectric portion 120 and generate an electrical output representative of pressure. The electrical output is a capacitance that varies as a function of pressure. First capacitor plate 122 is separated from second capacitor plate 124 by a space 126 in the cavity 108. The movable dielectric portion 120 moves through the space 126 to vary the electrical output.

In the arrangement shown in FIGS. 3–5, the space 126 in the cavity 108 does not intersect with a straight line 128 between the first and second capacitor plates 122, 124. It is found that there is enough electric field fringing out near the edges of the capacitor plates to sense movement of dielectric material near the electrodes, even though the dielectric is not moved through a straight line path between the capacitor plates. Alternatively, the space in the cavity 108 can intersects with a straight line between the first and second capacitor plates when the capacitor plates rise above the mounting surface and the dielectric portion travels directly between the plates, as explained below in connection with FIG. 12.

In FIGS. 3–5, the movable dielectric portion 120 and the diaphragm 114 are free from conductor metallizations. There is thus no problem with hysteresis or creeping of metal when the diaphragm deflects or bends with changing pressure. Preferably, the movable dielectric portion 120 is an integral part of the diaphragm 114, thus avoiding creep that might otherwise occur if there were bonding materials between the dielectric portion 120 and the diaphragm 114. The capacitor plates 122, 124 are fixed on a thicker support surface that does not deflect significantly.

The pressure sensor 100 is preferably direct bonded, evacuated and sealed so that there is a high quality vacuum in the cavity 108. A seal 127 is applied over a feedthrough notch 128 for the leads, and the seal 127 maintains the high vacuum. The seal 127 is preferably formed from a glass frit, for example, a mixture of finely divided glass dust and ethyl cellulose. After the glass frit is placed over the feedthrough notch, the glass frit is heated to drive off the ethyl cellulose and melt to the glass dust to form a glass seal. Alternatively, each lead can be brought out through a separate feedthrough notch and each notch can be sealed with a conductive solder or brazed seal.

The frame 106 is elongated and has a first end 130 including the pressurized diaphragm and a second end 132 opposite the first end that is isolated from the pressurization and includes electrical connections 134 for the capacitor plates 122, 124.

Figure 9:
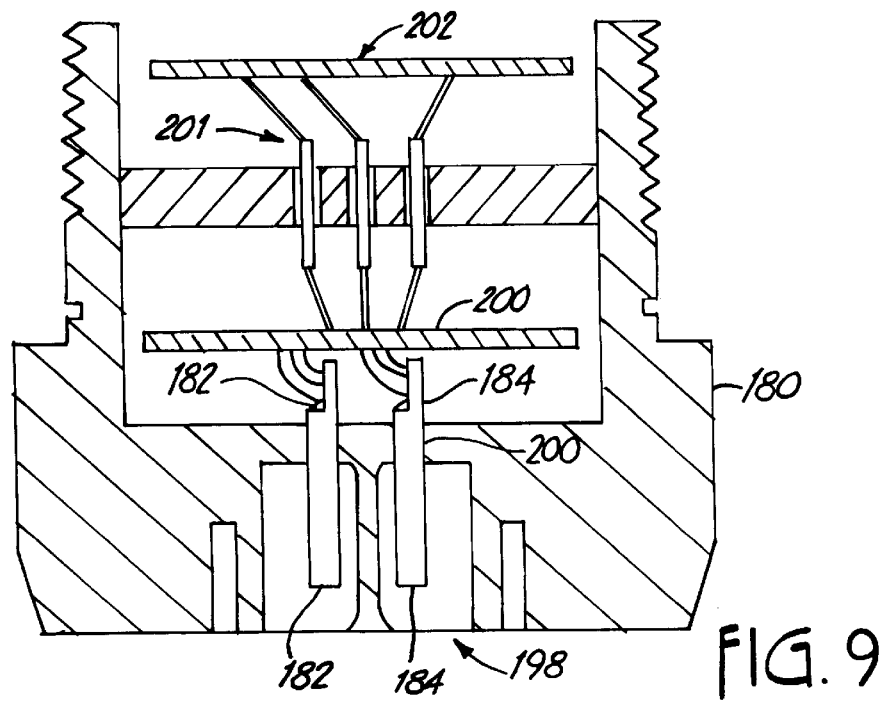
FIG. 9 shows a partial cross-sectional view of a pressure transmitter with capacitive sensors with moving dielectrics.
Figure 10:
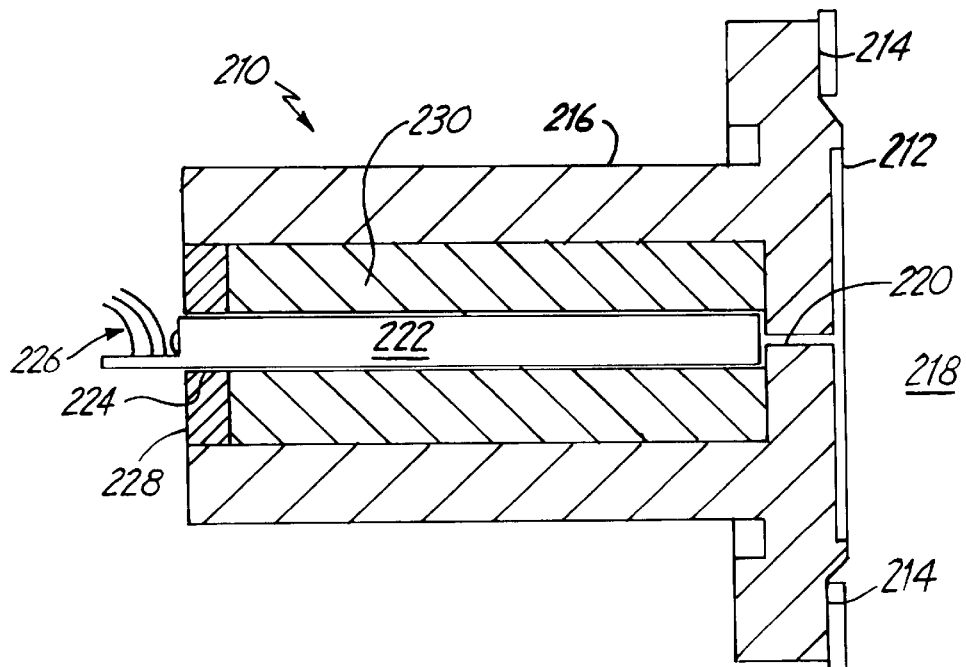
FIG. 10 shows a capacitive pressure sensor with moving dielectric arranged in an isolator assembly.

A mesa 136 provides increase support in a mounting area between the first and second ends 130, 132. The mounting area of the sensor 100 provides a place for a sealed barrier between the process fluid and the electrical connections as shown in FIGS. 9–10.

The pressure sensor 100 shown in FIGS. 3–5 can be seen as a beam 138 or elongated frame formed around a central channel or cavity 108. The pressure sensor has a support surface 140 in the central channel. The beam includes a diaphragm 114 that has an outer diaphragm surface 116 receiving pressure and has an inner diaphragm surface 118, 120 formed of dielectric. The inner diaphragm surface 120 is spaced away from the support surface 140 in the central channel. The dielectric 120 is movable relative to the support surface 140 by the pressure. Capacitor plates 122, 124 are fixed on the support surface 118 near the movable dielectric 120. The capacitor plates 122, 124 sense movement of the nearby dielectric 120 and provide an electrical output representing pressure on leads 134.

Figure 6:
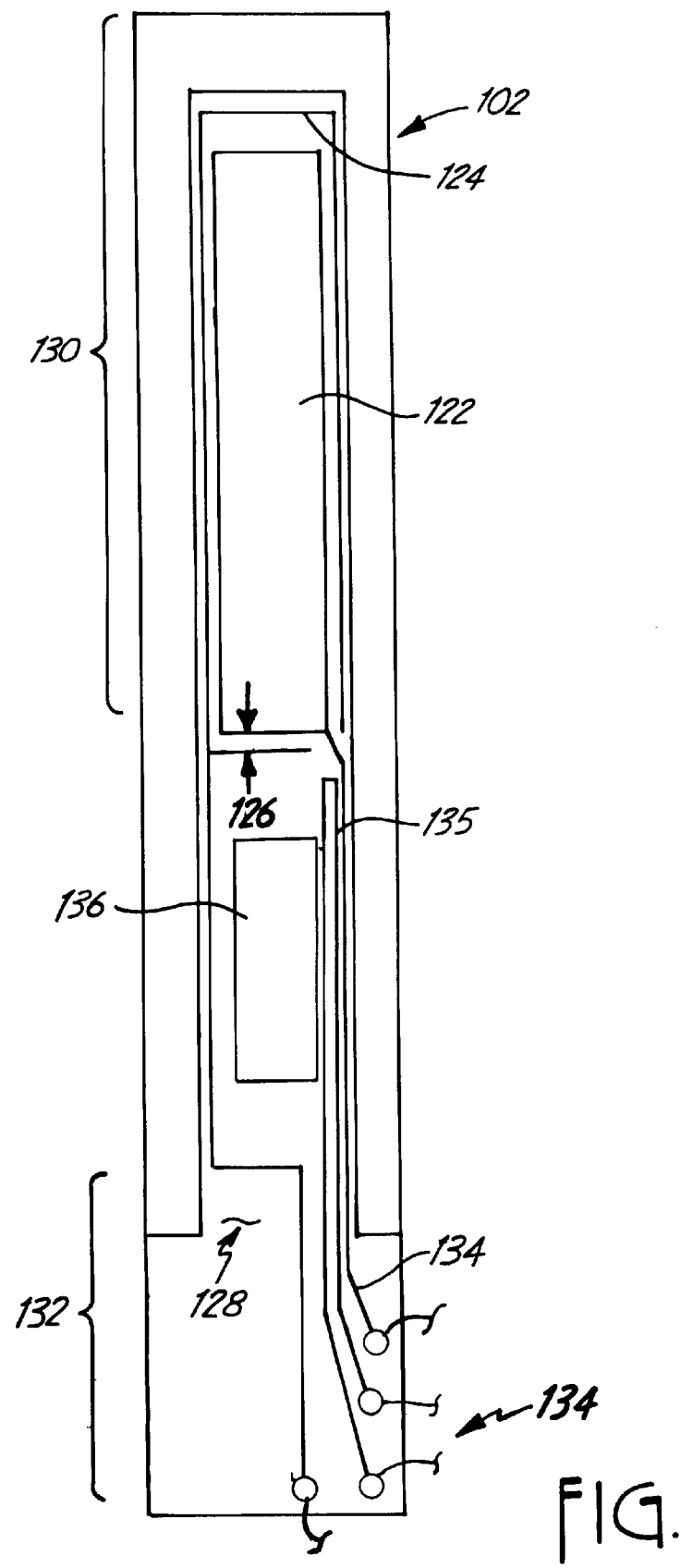
Figure 7:
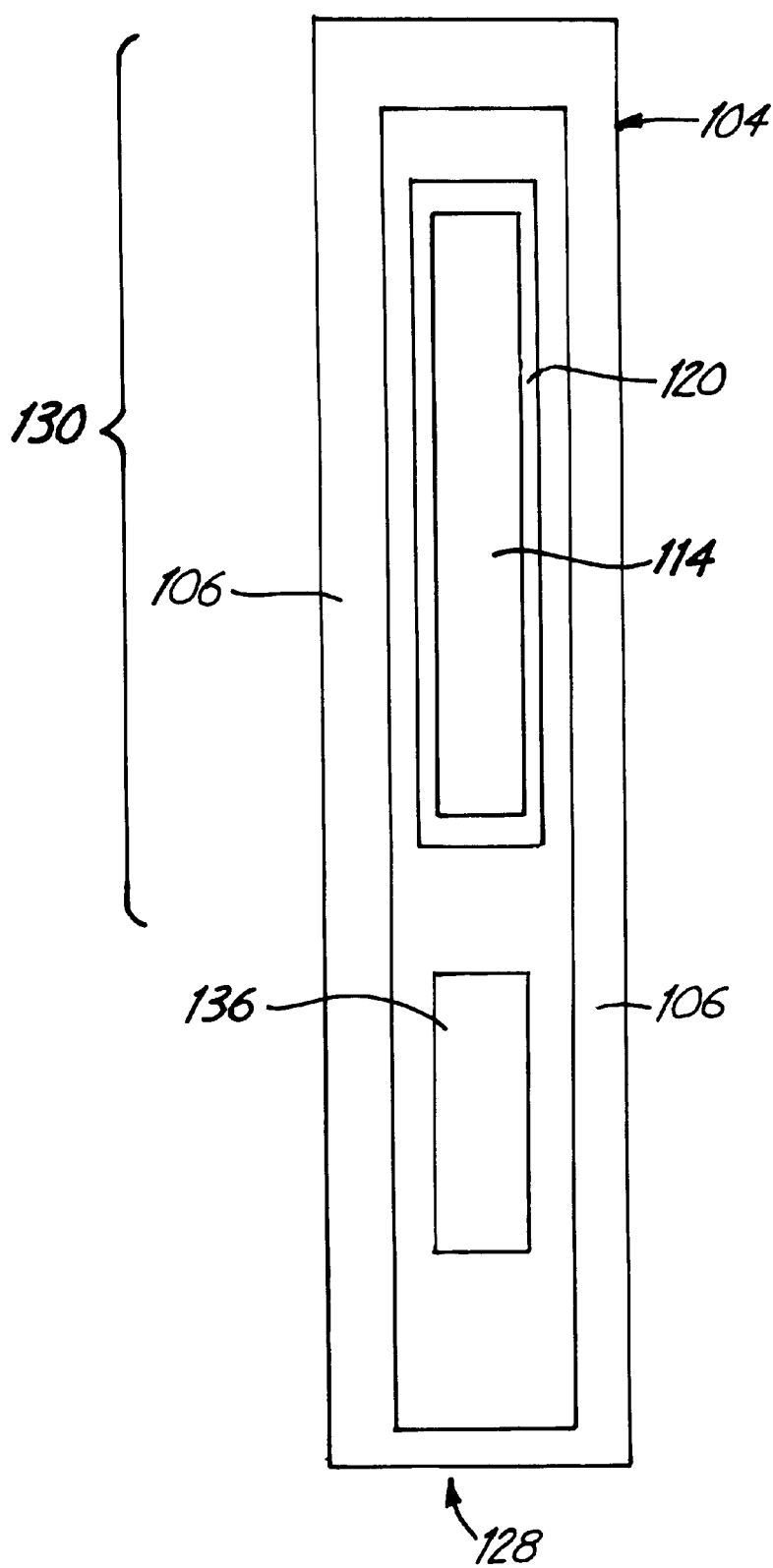

FIGS. 6–7 shown enlarged views of the layers 102, 104 and uses the same reference numbers as used in FIGS. 3–5. As shown in FIG. 6, the sensor 100 can also include a temperature sensor element 135 that can be connected to transmitter circuitry to provide improved temperature compensation. The temperature element 135 can be a thin film platinum resistance thermometer (PRT) as shown or a capacitance or other known type of temperature sensor can be used. As shown in FIG. 7, the layer 104 includes a diaphragm 114 that is free of metallizations. When diaphragm 114 deflects, there is no error due to creep of diaphragm metallizations.

Figure 8:
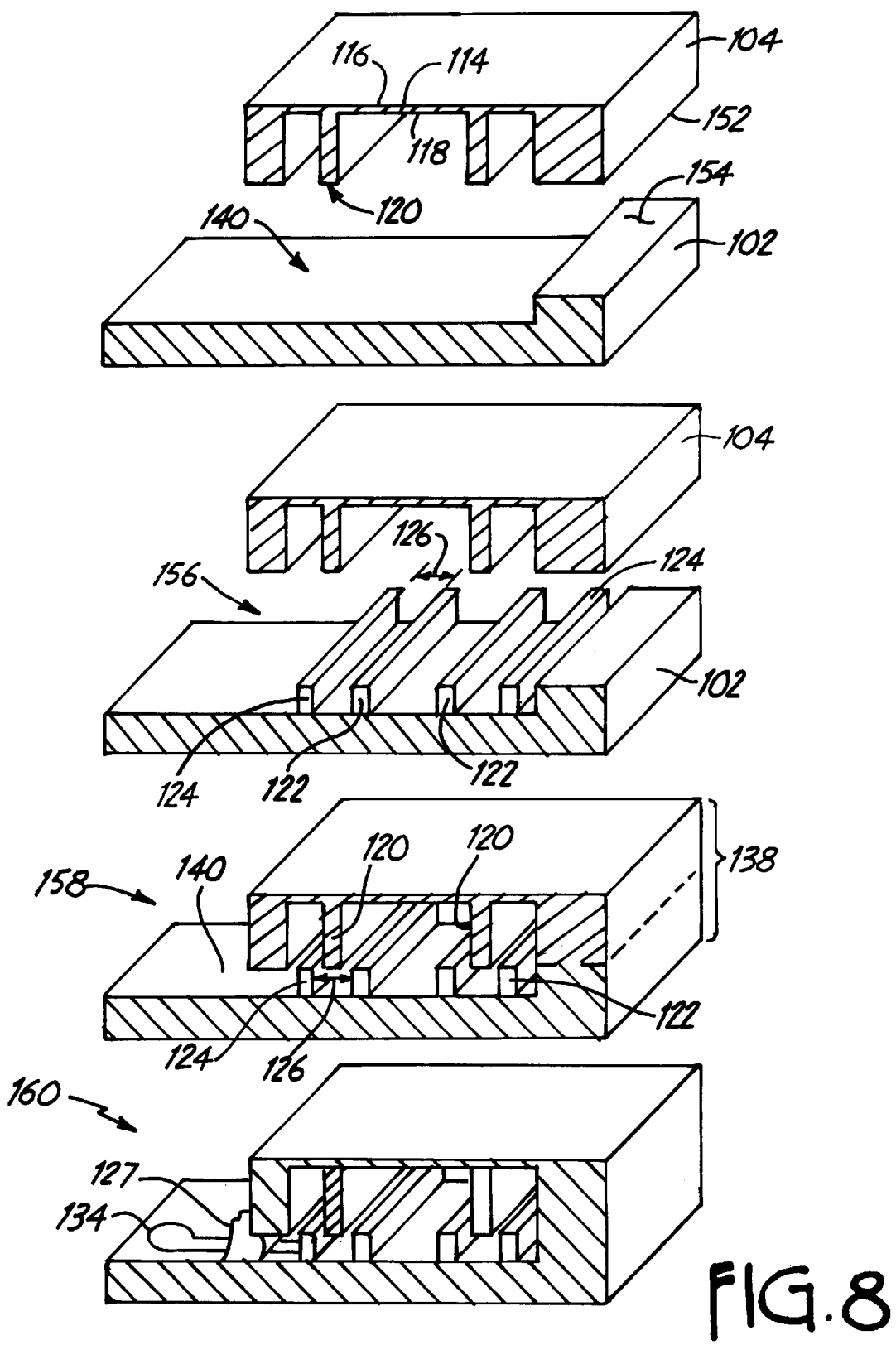
FIG. 8 shows a method of manufacturing a capacitive pressure sensor with a moving dielectric.

The sensor 100 is manufactured by a preferred method illustrated by schematic sectional views in FIG. 8. First, layers 102, 104 are shaped to form the components of a beam as shown at 138. Shaping is typically done by use of selective chemical etching of flat layers using masking techniques common to microstructure fabrication processes. Mating surfaces 152, 154 are finished to be optically flat for direct bonding. Next, sensing films 122, 124 are deposited on layer 102 as shown at 156. Then, the shaped layers 102, 104 are stacked in direct contact with one another to form the beam 138 having capacitor plates 122, 124 on a support surface 140 with a space 126 between them and a dielectric portion 120 deflectable in the space 126 near the capacitor plates as shown at 158. The beam 138 is then heated while the layers are in direct contact with one another at optically flat faces that are extremely clean. No bonding materials are needed with direct bonding, and in some cases the bond will be adequate without heating.

The channel is sealed by forming a glass frit seal 127 in the gap around the leads as shown at 160. The channel is preferably sealed with a vacuum in it to make the sensor an absolute pressure sensor.

In FIG. 9, a pressure sensing module 180 is shown which corresponds to module 54 shown in FIG. 2. Assembly 180 includes two sensors 182, 184 as shown in FIGS. 3–7. In FIG. 9, an isolation cup 198 has an opening 200 sealed to an outer surface of the beam between the blind end and the opposite, isolated end. The sensors 182, 184 are wired to a circuit card 203 which in turn is wired through a sealed feedthrough 201 to a second circuit card 202.

In FIG. 10, a sensing module 210 is shown that includes an isolator diaphragm 212 with a rim 214 sealed to an isolator cup 216. Isolator diaphragm 212 separates process fluid 218 from isolator fluid 220 that is sealed in the space enclosed by the isolator cup 216 and the isolator diaphragm 212. Sensor 222 is constructed as shown in FIGS. 3–7 and is sealed to an opening 224 in the isolator cup 216. The isolator diaphragm 212 and isolator fluid 220 couple pressure to the sensor 222 while isolating the sensor from the process fluid 218. Isolator cup 216 has sensor 222 passing through sealed opening 224 and isolates electrical connections 226 on the sensor 222 from both the pressurized process fluid 218 and the pressurized isolator fluid 220. The isolator cup can include a back plate 228 which has a temperature coefficient of expansion closely matched to the temperature coefficient of expansion of the sensor 222. A block of material 230 can be pressed in the isolator cup 216 and material 230 has a temperature coefficient of expansion which partially compensates for the temperature coefficient of expansion of the isolator fluid 220 to limit undesired movement of isolator diaphragm 212 due to temperature changes. A small gap filled with isolator fluid 220 is provided between block 230 and sensor 222.

Figure 11:
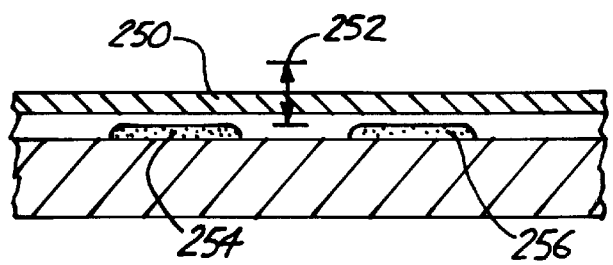
FIGS. 11–13 show arrangements of capacitor plates and moving dielectrics in a capacitive pressure sensor.
Figure 12:
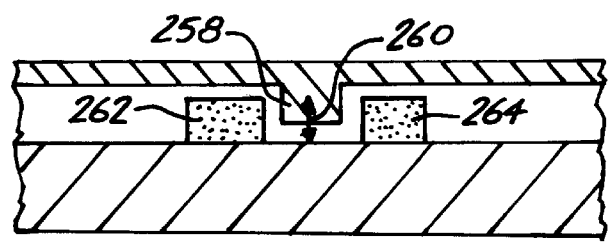
Figure 13:
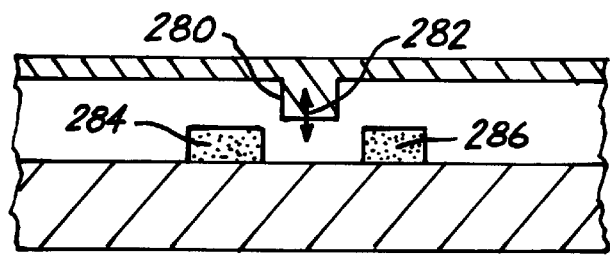

In FIGS. 11–13, alternative embodiments of the fixed capacitor plates and moving dielectric are shown. In FIG. 11 a flat dielectric portion 250, which is a diaphragm, moves in a space 252 that is not directly between capacitor plates 254, 256, but slightly above the capacitor plates in a region of fringing electrical field from the capacitor plates.

In FIG. 12, a dielectric portion 258 moves in a space 260 that is on a direct line between capacitor plates 262, 264.

In FIG. 13, a dielectric portion 280 moves in a space 282 that is not on a direct line between capacitor plates 284, 286.

Figure 14:
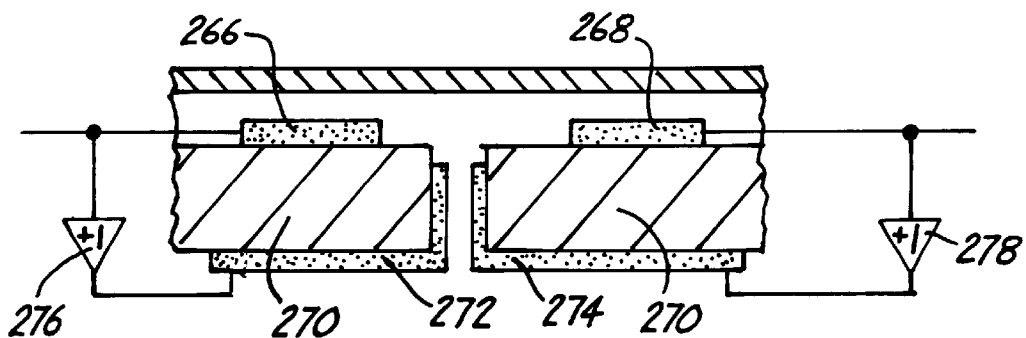
FIG. 14 show a capacitive pressure sensor with moving dielectric and a shielding arrangement.

In FIG. 14, capacitor plates 266, 268 are shielded from stray coupling through a support plate 270 by shield or screen electrodes 272, 274. Screen electrodes 272, 274 are driven by unity gain buffers at 276, 278.

Figure 15:
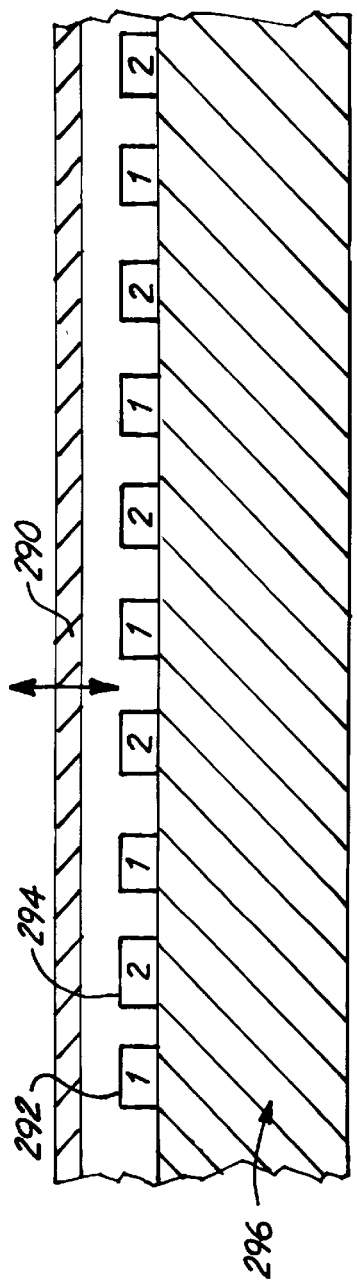
FIGS. 15–16 show an interdigitated electrode arrangement for a capacitive sensor with a moving dielectric.
Figure 16:
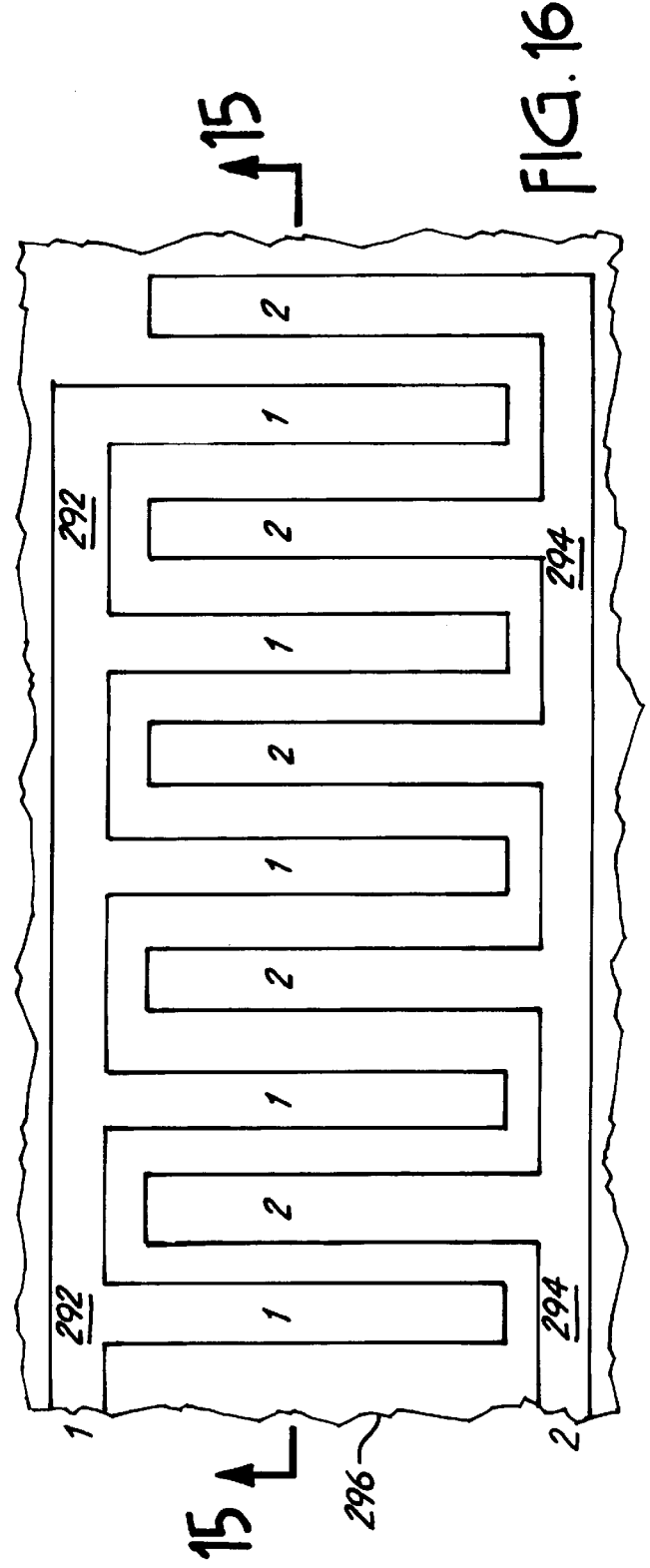

In FIGS. 15–16, an embodiment with moving dielectric 290 and interdigitated fixed capacitor plates 292, 294 on support surface 296 is shown. The interdigitated arrangement for the capacitor plates provides a higher capacitance in a more compact space near a diaphragm. The term interdigitated, as used in this application, means that the capacitor plates are not simple rectangular or round plates, but have a complex geometry which provides a lengthy gap between plates in a small surface area. Interdigitated capacitor plates can include arrangements like those shown where there are alternating multiple fingers on each plate and also include serpentine plates that are zig-zagged next to each other to provide a lengthy gap in a small space. Combinations of fingers and serpentine paths are also contemplated.

Figure 17:
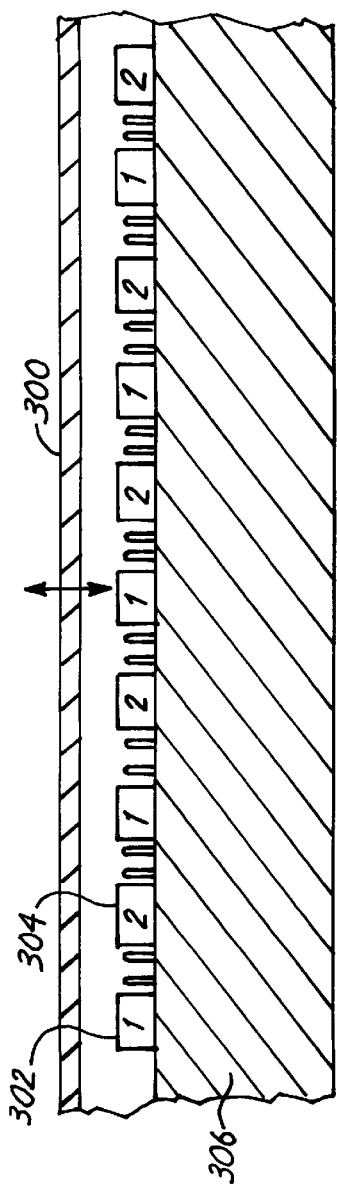
FIGS. 17–18 show a shielding arrangement for interdigitated electrodes.
Figure 18:
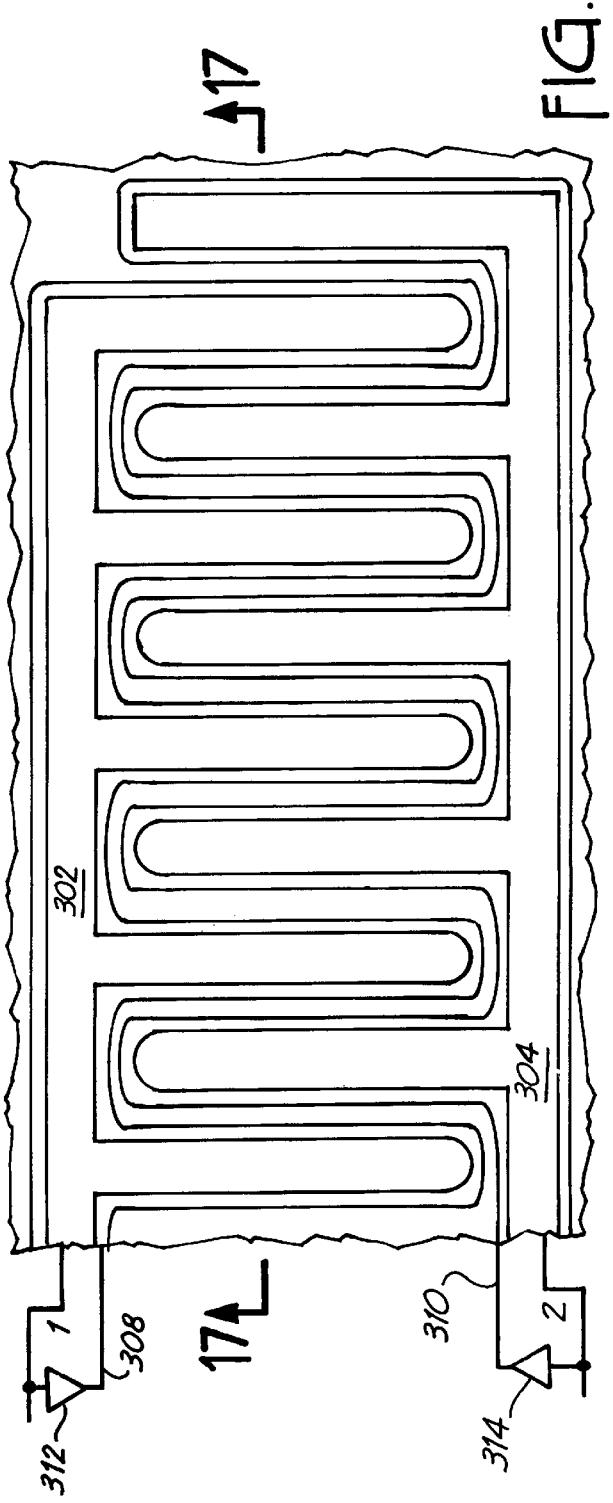

In FIGS. 17–18, an embodiment with moving dielectric 300, interdigitated fixed capacitor plates 302, 304 on support plate 306 and electric shield conductors 308, 310 driven by unity gain buffers 312, 314 are shown. This arrangement provides high capacitance in a compact space for a pressure sensor with improved gauge factor ($\Delta C/C_0$) due to reduced effective stray capacitance. The ratio of $\Delta C$, the change of capacitance from minimum to full scale pressure, divided by $C_0$, the rest capacitance, is higher because $C_0$ is smaller due to the electric shield conductors 308, 310 being actively driven by the buffers 312, 314. The shield conductors 308, 310 are dynamically maintained at substantially the same potential as an adjacent capacitor plate by the buffers.

Shields or screen electrodes that are grounded can also be provided in regions peripheral to capacitor plates to reduce coupling of noise to the capacitor plates.

Figure 19:
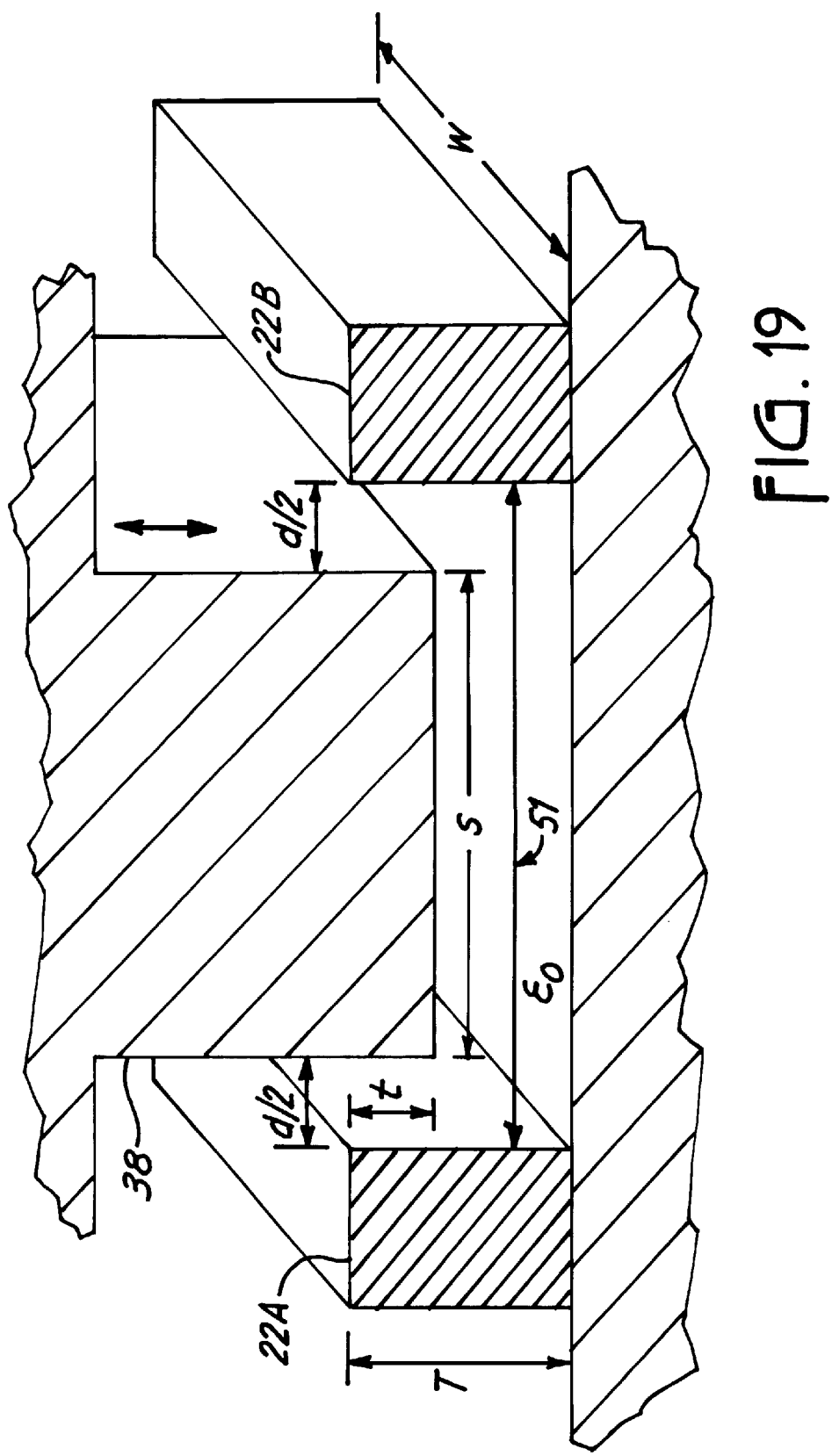
FIG. 19 shows geometric arrangements of capacitor plates.

FIG. 19 shows a dimensional arrangement of capacitor plates and an interposed dielectric. The capacitance of spaced apart electrodes, as a function of the displacement (t) of the dielectric diaphragm and neglecting parasitic effects is given by the following equation:

$$C(t) =\epsilon_0 W\left[\frac{(T-t)}{(s+d)} + \frac{(tK)}{(s+Kd)}\right] \qquad \text{Eq. 1}$$

where:

$\epsilon_0$ = permittivity of free space;

W = the length of opposed facing surfaces of electrodes 22A and 22B;

T = the height of electrodes 22A and 22B;

t = the portion of the height of protrusion 38 that is along straight lines of height between the electrodes 22A and 22B;

K = the relative permittivity of the material forming the dielectric protrusion 38;

S = the width of the protrusion 38 extending between the electrodes 22A and 22B;

d = the width calculated by subtracting the width S from the width indicated by arrow 51 between facing surfaces of the electrodes 22A and 22B.

The span of the capacitance between the electrodes, also called capacitor plates, is:

$$\Delta C = C(t) - C(0) \qquad \text{Eq. 2}$$

Combining Eq. 1 and Eq. 2, $$\Delta C = \epsilon_0 W t \left[\frac{K}{(s+Kd)} - \frac{1}{(s+d)}\right] \qquad \text{Eq. 3}$$

The arrangement has many advantages over conventional moving plate capacitive sensors. The moving dielectric arrangement can have gain factors of 5 or more compared to the conventional arrangement. Less deflection is needed for a comparable change in capacitance. Also, a material with a higher dielectric constant can be used for the moving dielectric portion and a material with a lower dielectric constant can be used to support the capacitor plates to reduce stray capacitance. The relationship between pressure and capacitance change is more linear with the moving dielectric, reducing needs for electronic compensation or linearization. The arrangement provides inherent overpressure protection and there is no danger of the capacitor plates shorting out under overpressure condition, or going to an extremely high capacitance value during overpressure condition. Fabrication is simple because plating of capacitor plates need only be done on one layer, leaving the diaphragm free of metallizations.

Figure 20:
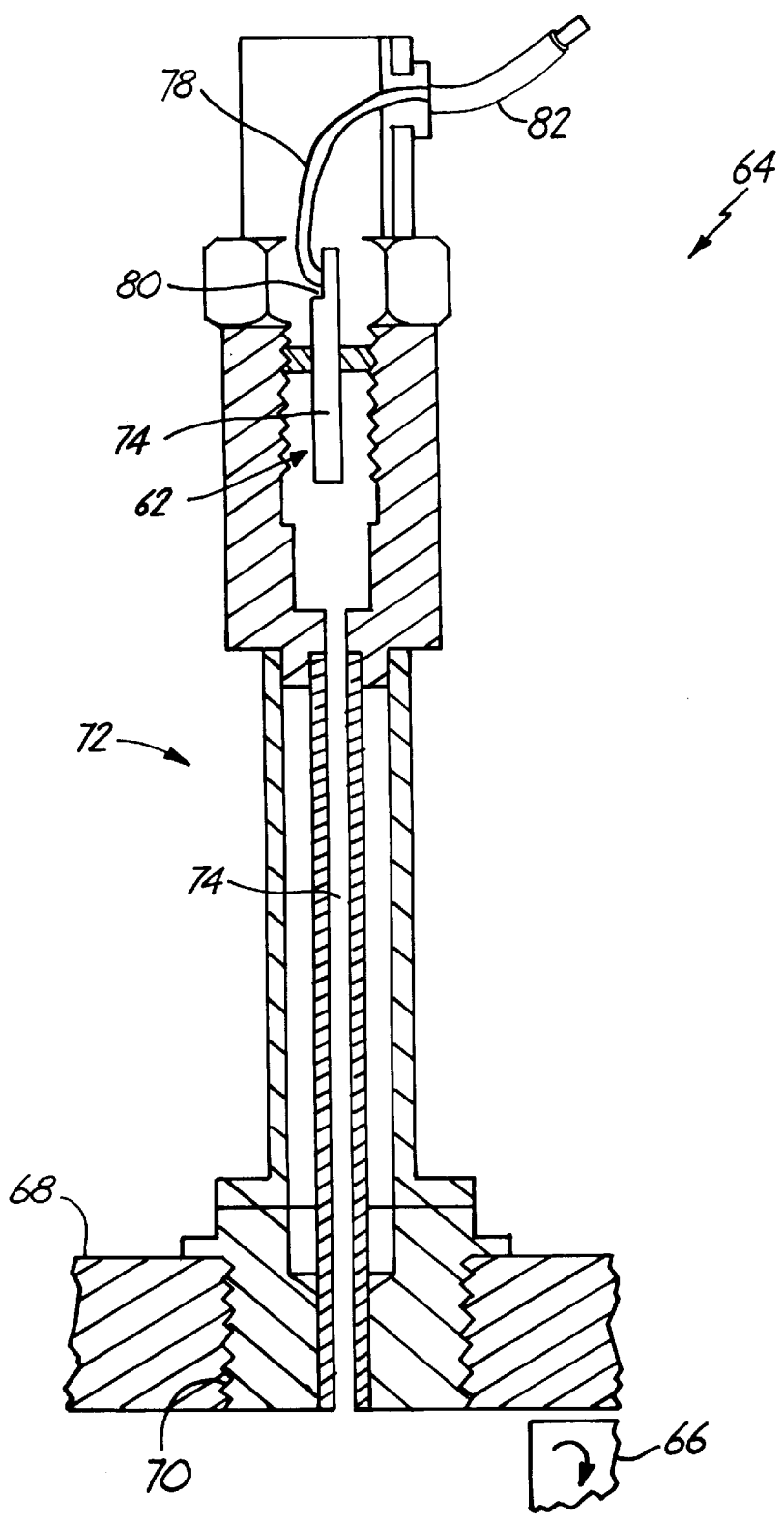
FIG. 20 shows an environment for an aerospace probe.

FIG. 20 shows a pressure sensor arrangement 62 for a turbine engine arrangement 64. The turbine engine includes turbine engine blades such as blade 66 rotating in a turbine engine housing 68. A hole 70 is provided in the turbine engine housing 68 for sensing pressure in the turbine engine. Pressure sensor arrangement 62 is spaced apart from the turbine housing 68 by a pedestal 72. Pedestal 72 spaces pressure sensor arrangement 62 away from the turbine housing to provide a lower temperature environment for pressure sensor arrangement 62. A passageway 74 through pedestal 72 couples the pressurized. gasses inside the turbine housing to the pressure sensing arrangement 62. A pressure sensor 74 is included in pressure sensing arrangement 62. Pressure sensor 74 includes a moving dielectric. Pressure sensor 74 also includes isolated sensor leads 78 that pass through a sealed gap 80 in the beam and connect to electronic conversion circuits (not shown) by leads 82.

Although the present invention has been described with reference to preferred embodiments, workers skilled in the art will recognize that changes may be made in form and detail without departing from the spirit and scope of the invention.

What is claimed is:

1. A pressure sensor, comprising:

a frame surrounding a cavity;

a diaphragm supported on the frame and having an outer surface receiving pressure and having an inner surface facing the cavity;

a dielectric portion carried on the inner surface, the dielectric portion being movable relative to the frame by the pressure; and capacitor plates fixed relative to the frame in the cavity near the movable dielectric portion, the capacitor plates sensing movement of the nearby dielectric portion and generating an electrical output representative of pressure.

2. The pressure sensor of claim 1 wherein the capacitor plates include a first capacitor plate separated from a second capacitor plate by a space in the cavity, the movable dielectric portion being movable through the space to vary the electrical output.

3. The pressure sensor of claim 2 wherein the space in the cavity intersects with a straight line between the first and second capacitor plates.

4. The pressure sensor of claim 2 wherein the space in the cavity does not intersect with a straight line between the first and second capacitor plates.

5. The pressure sensor of claim 1 wherein the movable dielectric is free of conductors.

6. The pressure sensor of claim 1 wherein the cavity is evacuated and sealed.

7. The pressure sensor of claim 1 wherein the frame is elongated and has a first end including the diaphragm and a second end opposite the first end that is isolated from the pressurization and includes electrical connections for the capacitor plates.

8. The pressure sensor of claim 1 wherein the capacitor plates are interdigitated.

9. The pressure sensor of claim 8 further comprising a support plate upon which the capacitor plates are disposed and comprising screen electrodes disposed on the support plate.

10. The pressure sensor of claim 9 further comprising unity gain buffers coupled to the screen electrodes.

11. A pressure sensor, comprising:

a beam formed around a central channel and having a support surface in the central channel, the beam including a diaphragm having an outer diaphragm surface receiving pressure and having an inner diaphragm surface formed of dielectric and spaced away from the support surface in the central channel, the dielectric being movable relative to the support surface by the pressure; and capacitor plates fixed on the support surface near the movable dielectric, the capacitor plates sensing movement of the nearby dielectric and providing an electrical output representing pressure.

12. The pressure sensor of claim 11 wherein the capacitor plates include a first capacitor plate separated from a second capacitor plate by a space in the central channel, the movable dielectric portion being movable through the space to vary the electrical output.

13. The pressure sensor of claim 11 wherein the space in the central channel intersects with a straight line between the first and second capacitor plates.

14. The pressure sensor of claim 11 wherein the space in the central channel does not intersect with a straight line between the first and second capacitor plates.

15. The pressure sensor of claim 11 wherein the movable dielectric is free of conductors.

16. The pressure sensor of claim 11 wherein the central channel is evacuated and sealed.

17. The pressure sensor of claim 11 wherein the frame is elongated and has a first end including the diaphragm and a second end opposite the first end that is isolated from the pressurization and includes. electrical connections for the capacitor plates.

18. The pressure sensor of claim 11 wherein the capacitor plates are interdigitated.

19. The pressure sensor of claim 18 further comprising screen electrodes disposed on the support surface.

20. The pressure sensor of claim 19 further comprising unity gain buffers coupled to the screen electrodes.

21. A pressure sensor, comprising:

a frame surrounding a cavity;

a diaphragm supported on the frame and having an outer surface receiving pressure and having an inner surface facing the cavity;

a dielectric portion carried on the inner surface, the dielectric portion being movable relative to the frame by the pressure; and means for sensing movement of the dielectric portion including capacitor plates fixed relative to the frame in the cavity near the movable dielectric portion, the capacitor plates generating an electrical output representative of pressure.

22. A pressure sensor, comprising:

a beam formed around a central channel and having a support surface in the central channel, the beam including a diaphragm having an outer diaphragm surface receiving pressure and having an inner diaphragm surface formed of dielectric and spaced away from the support surface in the central channel, the dielectric being movable relative to the support surface by the pressure; and means for sensing movement of the dielectric including capacitor plates fixed on the support surface near the movable dielectric, the capacitor plates providing an electrical output representing pressure.

* * * * *

UNITED STATES PATENT AND TRADEMARK OFFICE
CERTIFICATE OF CORRECTION

PATENT NO. : 6,505,516 B1 Page 1 of 1
DATED : January 14, 2003
INVENTOR(S) : Frick et al.

It is certified that error appears in the above-identified patent and that said Letters Patent is hereby corrected as shown below:

Column 8,
Line 19, after "includes" delete ".".

Signed and Sealed this

Fourteenth Day of September, 2004

JON W. DUDAS
*Director of the United States Patent and Trademark Office*